United States Patent
Kirichenko et al.

(10) Patent No.: US 10,311,608 B2
(45) Date of Patent: Jun. 4, 2019

(54) CUSTOM MULTI AXIS CHART VISUALIZATION

(71) Applicant: MICROSOFT TECHNOLOGY LICENSING, LLC, Redmond, WA (US)

(72) Inventors: Alex V. Kirichenko, Federal Way, WA (US); Aleksey V. Kirichenko, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/451,057

(22) Filed: Mar. 6, 2017

(65) Prior Publication Data

US 2018/0165844 A1 Jun. 14, 2018

Related U.S. Application Data

(60) Provisional application No. 62/431,776, filed on Dec. 8, 2016.

(51) Int. Cl.
*G06T 11/20* (2006.01)

(52) U.S. Cl.
CPC .................. *G06T 11/206* (2013.01)

(58) Field of Classification Search
CPC ........ G06T 11/206; G06T 3/40; G06T 11/001
See application file for complete search history.

(56) References Cited

U.S. PATENT DOCUMENTS

| | | | |
|---|---|---|---|
| 5,485,564 A | 1/1996 | Miura | |
| 5,784,067 A | 7/1998 | Ryll et al. | |
| 5,894,311 A | 4/1999 | Jackson | |
| 7,084,872 B2 | 8/2006 | Etgen et al. | |
| 7,248,263 B2 | 7/2007 | Freeman et al. | |
| 7,369,127 B1 | 5/2008 | Hull | |
| 8,432,397 B2 | 4/2013 | Kishimoto et al. | |
| 8,527,909 B1 | 9/2013 | Mullany | |
| 8,907,953 B2 | 12/2014 | Fotev | |
| 9,361,649 B2 | 6/2016 | Singer et al. | |
| 2004/0196286 A1 | 10/2004 | Guzik | |
| 2004/0227759 A1 | 11/2004 | Mcknight et al. | |
| 2010/0005411 A1* | 1/2010 | Duncker | G06F 17/30873 715/769 |
| 2010/0070489 A1 | 3/2010 | Aymeloglu et al. | |

(Continued)

FOREIGN PATENT DOCUMENTS

CA    2247030 A1    3/2000

OTHER PUBLICATIONS

Jansen, Christian, "Automatic Axis Scaling", https://www.google.co.in/url?sa=t&rct=j&q=&esrc=s&source=web&cd=19&cad=rja&uact=8&ved=0ahUKEwjBi8uijrDQAhUKPo8KHRliB_04ChAWCEkwCA&url=http%3A%2F%2Fwww.openoffice.org%2Fspecs%2Fchart%2FChartAxisAutoScaling.odt&usg=AFQjCNE5aoP_wRkgkY7SZ4wejcSxj51r7Q, Retrieved on: Nov. 17, 2016, 13 pages.

(Continued)

*Primary Examiner* — Samantha (Yuehan) Wang
(74) *Attorney, Agent, or Firm* — Workman Nydegger

(57) ABSTRACT

Systems and methods are provided for generating interactive chart visualizations that incorporate multiple datasets. The charts include different scales that correspond to the different datasets. At least one of the scales can also be selectively hidden. The hidden scale(s) will be rendered in response to user input selecting data/objects corresponding to the hidden scale(s).

20 Claims, 12 Drawing Sheets

(56) References Cited

U.S. PATENT DOCUMENTS

| | | | |
|---|---|---|---|
| 2011/0050702 A1* | 3/2011 | Heimendinger | G06T 11/206 345/440 |
| 2012/0017165 A1 | 1/2012 | Gardner et al. | |
| 2015/0193595 A1 | 7/2015 | Mcnamara et al. | |
| 2015/0234549 A1 | 8/2015 | Mingione | |
| 2016/0012154 A1* | 1/2016 | Ikejima | G06T 11/206 707/798 |
| 2016/0054894 A1 | 2/2016 | Zhang et al. | |
| 2016/0055232 A1 | 2/2016 | Yang et al. | |

OTHER PUBLICATIONS

"Highcharts Demos", http://www.highcharts.com/demo/combo-multi-axes, Retrieved on: Nov. 17, 2016, 1 pages.

Ks, Prazval, "Blended Axes in Tableau", http://tableaugurus.blogspot.in/2014/02/blended-axes-in-tableau.html, Published on: Feb. 16, 2014, 2 pages.

"Controlling the Graph Axis Display Range", http://web.archive.org/web/20131114032916/http:/www.originlab.com/doc/Origin-Help/Axis-DisplayRange-Control, Published on: Nov. 14, 2013, 2 pages.

"Create a combo chart with a secondary axis", https://support.office.com/en-us/article/Create-a-combo-chart-with-a-secondary-axis-1d119e2d-1a5f-45a4-8ad3-bacc7430c0a1, Retrieved on: Nov. 17, 2016, 3 pages.

"Alter Plot and Chart Appearances", http://www.jmp.com/support/help/Alter_Plot_and_Chart_Appearances_shtml, Retrieved on: Dec. 13, 2016, 16 pages.

\* cited by examiner

CUSTOM MULTI AXIS CHART VISUALIZATION

CROSS-REFERENCE TO RELATED APPLICATIONS

This application claims the benefit of and priority to U.S. Provisional Patent Application Ser. No. 62/431,776 filed on Dec. 8, 2016, and entitled "CUSTOM MULTI AXIS CHART VISUALIZATION," which application is expressly incorporated herein by reference in its entirety.

BACKGROUND

In today's growing data society, telemetry data is collected from many distinct areas and charted to help data scientists find correlations that may exist between the data. However, existing technologies for charting data are somewhat limited in their capability to render a plurality of different data types within a single chart in an intuitive and meaningful way. For instance, by way of example, it can be difficult to chart both the temperature and energy levels of a datacenter over a given period of time within a single chart because the values for the temperature and the energy levels correspond to different magnitudes and types of data. It can be particularly difficult to select an appropriate scale that accommodates both the temperature values and the energy values in such a way as to visualize the variations of the data in a single chart.

Some charts have been configured to simultaneously present different datasets within a single chart by simultaneously presenting multiple scales (e.g., a plurality of Y Axis scales, one for each dataset). However, when there are a lot of different scales and datasets presented in a single chart, it can be difficult to identify which datasets correspond to which scales. As a result, users often waste time and computing resources in an attempt to manipulate the charted visualizations into a more intuitive format.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY OF THE INVENTION

The embodiments presented herein include systems and methods for generating interactive charts that include interactive chart visualizations and that incorporate multiple datasets. Further, these charts can include multiple scales so that each of the datasets has at least one corresponding scale. Additionally, at least one of the different scales can be selectively hidden.

In some embodiments, a plurality of datasets are identified for simultaneous presentation as separate chart visualizations within a single interactive chart. The plurality of datasets have values corresponding to a first common category, such as time or another common category. By utilizing the first common category, the datasets can be charted along a first axis (e.g., the X axis) of the interactive chart. The datasets also have other values corresponding to different, uncommon categories (e.g., data types) that are charted along a second axis (e.g., the Y axis) of the interactive chart. Accordingly, different chart scales will correspond to the different categories that are charted along the second axis.

Other embodiments include an interactive chart that is configured to render separate chart visualizations generated for each of the datasets. Using these visualizations, the embodiments are usable to identify a maximum value and a minimum value for each of the different categories of the separate chart visualizations. These values can then be charted along the second axis. The size of each of the chart visualizations is also scaled, in some embodiments, based on the maximum and minimum values, to fit within certain size dimensions of a common frame that corresponds to the first and second axis of the chart. The separate chart visualizations are then rendered for the plurality of datasets within the interactive chart.

In some embodiments, upon determining 1) that the separate chart visualizations include a first chart visualization corresponding to a first scale for the second axis and 2) that a second chart visualization corresponds to a second scale for the second axis that is different than the first scale, the system will selectively render either the first or second scale, while hiding the other scale. Then, in response to receiving user input selecting the hidden chart visualization corresponding to the hidden scale, the hidden scale will be rendered. In some instances, rendering the hidden scale will also correspond with and/or trigger the hiding of the previously rendered scale.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE INVENTION

The disclosed embodiments include systems and methods for generating interactive charts that includes interactive chart visualizations and that incorporate multiple datasets. These charts include different scales that correspond to each of the multiple datasets. Additionally, at least one of the different scales can be selectively hidden.

The disclosed embodiments are useful, in some instances, to facilitate the manner in which chart visualizations are presented and rendered simultaneously in a chart. The embodiments can provide this functionality even though the underlying datasets correspond to different scales and/or data types. As a result, these embodiments can, in some instances, help improve the readability of chart data (i.e. chart datasets). Even further, these embodiments are usable to identify fluctuations in the datasets while identifying correlations between disparate data. Examples and descriptions of the inventive embodiments will be described below with specific reference to FIGS. 1-15.

This disclosure also highlights some of the problems and deficiencies associated with existing chart technologies. Stated differently, the following discussion addresses specific deficiencies inherent in the existing charting technology.

Figure 1:
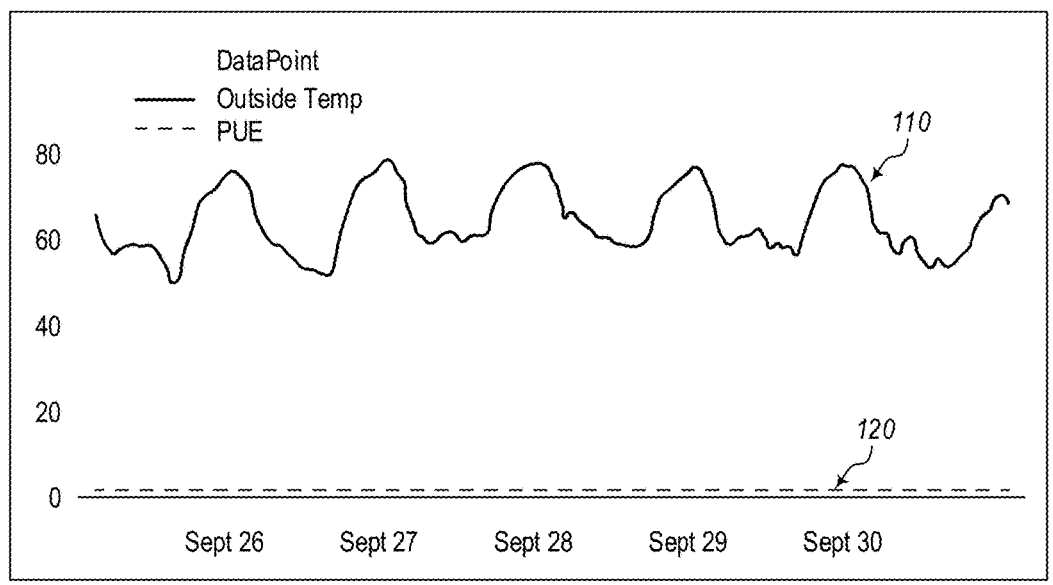
FIG. 1 illustrates an example of a chart in which multiple datasets can be visualized.

FIG. 1, for instance, shows a composite chart 100 that is produced according to existing technologies and that can be used to combine two datasets (e.g., dataset 110 and dataset 120). As illustrated in FIG. 1, this traditional composite chart 100 does have the ability to combine different scales and data types. For example, FIG. 1 displays two datasets, dataset 110 and dataset 120, across a seven-day period. More particularly, dataset 110 reflects an environment's outside temperature values while dataset 120 reflects a datacenter's Power Usage Effectiveness (PUE) values. Dataset 110 (i.e. the temperature visualization) corresponds to a scale in degrees (Fahrenheit). As indicated in FIG. 1, dataset 110 includes data points that fluctuate within a range of about 50 degrees to about 80 degrees. In contrast, dataset 120 (i.e. the PUE visualization) corresponds to a numeric scale and has data points that fluctuate between 1 and 2. For background, the PUE visualization reflects a measure of how efficiently a datacenter uses energy; or rather, the PUE visualization reflects how much energy the computing equipment is using (in contrast to cooling and other overhead).

A data scientist may desire to concurrently view the temperature values (i.e. dataset 110) and the PUE values (i.e. dataset 120) within a single chart in order to identify any correlations that may exist between the temperature and the PUE during a particular period of time. However, as shown in FIG. 1, it is difficult to view the variations in the PUE data because the PUE data was forced to use the same scale that is being used for the temperature values. As a result, the data scientist will have a difficult time identifying any such correlations between the two datasets.

Some of the disclosed embodiments address the foregoing problem. By way of example and not limitation, the embodiments can be configured to independently scale each of the different visualizations. Using such scaling effects, the embodiments can "best fit" the datasets so that they are visualized within a predefined frame or other geometric dimension of the chart (e.g., axis height or width dimension). Therefore, rather than scaling the visualizations to a single shared scale, the visualizations can each be rendered according to a specifically tailored (i.e. "best") scale. In these circumstances, the scaling can be performed by following a two-step approach. One step includes mapping a highest/maximum value of the visualization to a first boundary of the geometric dimension (e.g., top of the frame/axis of the chart). A different step includes mapping the minimum/lowest value of the visualization to the opposite boundary (e.g., bottom of the frame/axis of the chart). Notably, this scaling is different than what is used by existing scaling systems because those existing scaling systems simply force the different chart visualizations to share a common scale, as reflected by FIG. 1.

Figure 2:
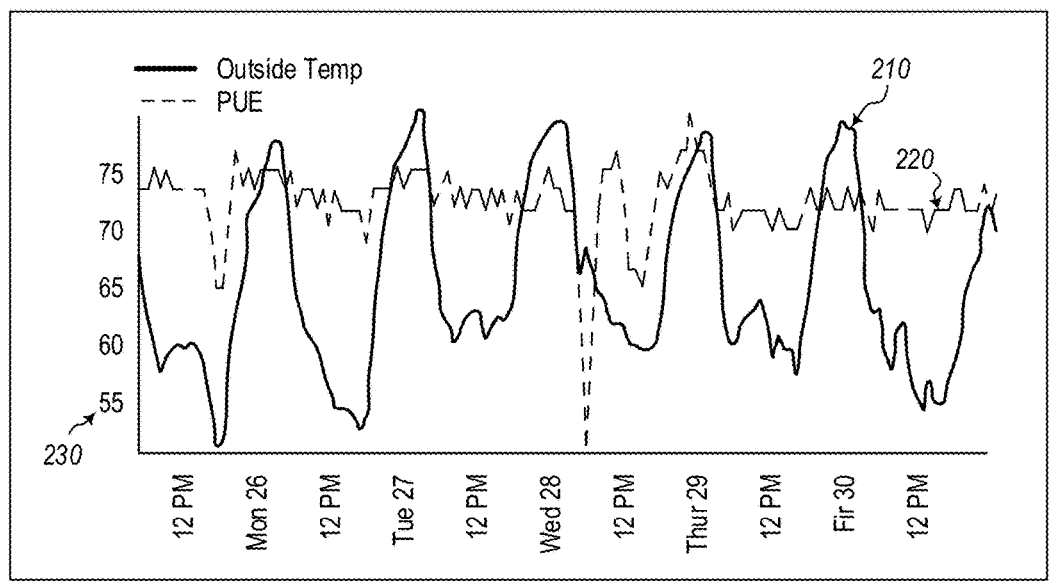
FIG. 2 illustrates an example of a chart in which multiple datasets can be visualized.

Similar to FIG. 1, FIG. 2 also illustrates a chart 200 that includes two datasets (i.e. dataset 210 and dataset 220). In particular, dataset 210 corresponds to dataset 110 from FIG. 1 (i.e. the outside temperature), and dataset 220 corresponds to dataset 120 (i.e. the PUE data). As shown in FIG. 2, dataset 220 is now scaled according to the geometric dimensions of the chart's frame/axis rather than to the scale of the other visualization (e.g., dataset 210) which was previously done in FIG. 1. With this improved scaling, it is clearly much easier to see variations and correlations between the data of the different datasets.

Figure 3:
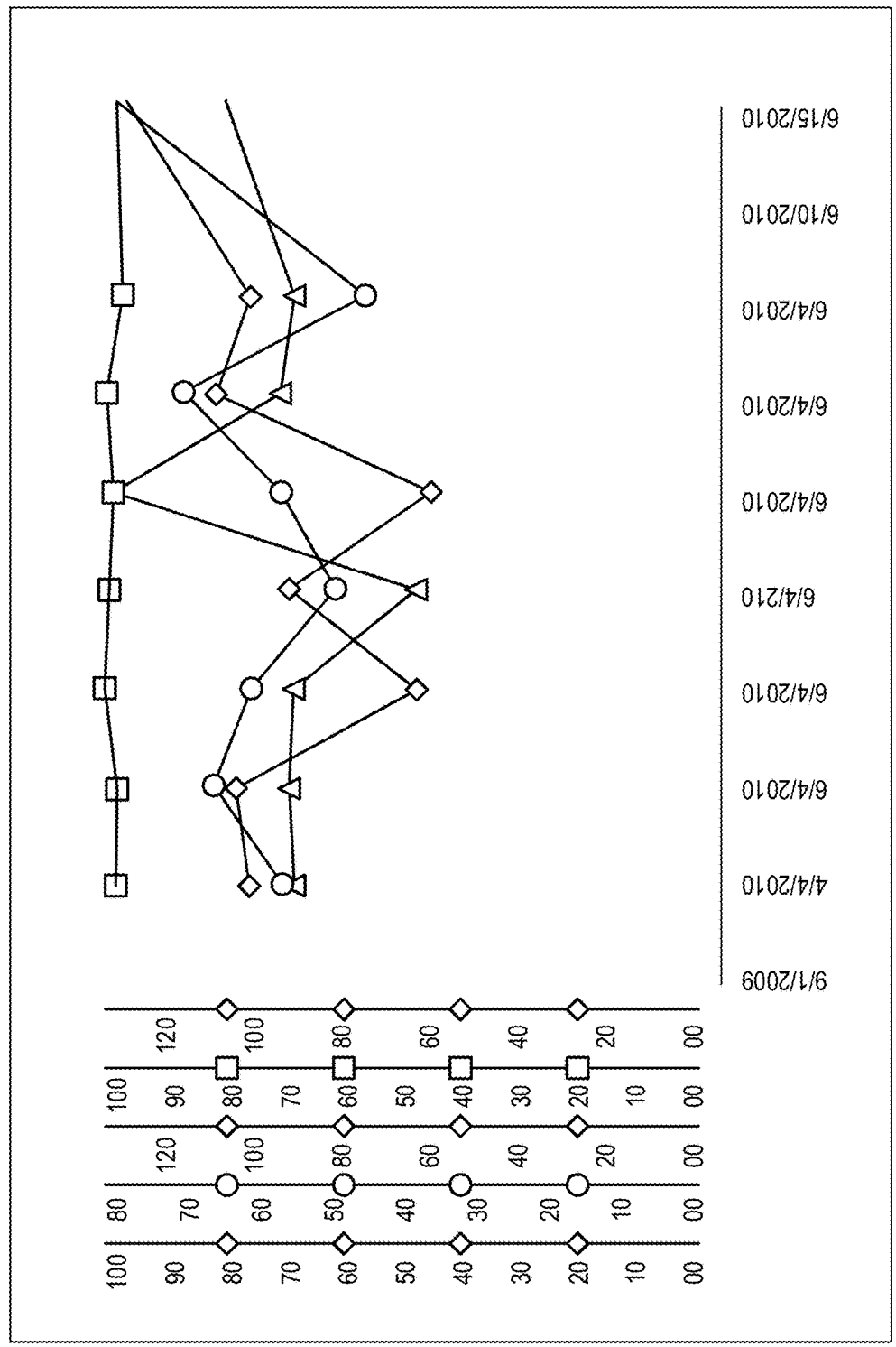
FIG. 3 illustrates an example of a chart in which multiple datasets can be visualized.
Figure 4:
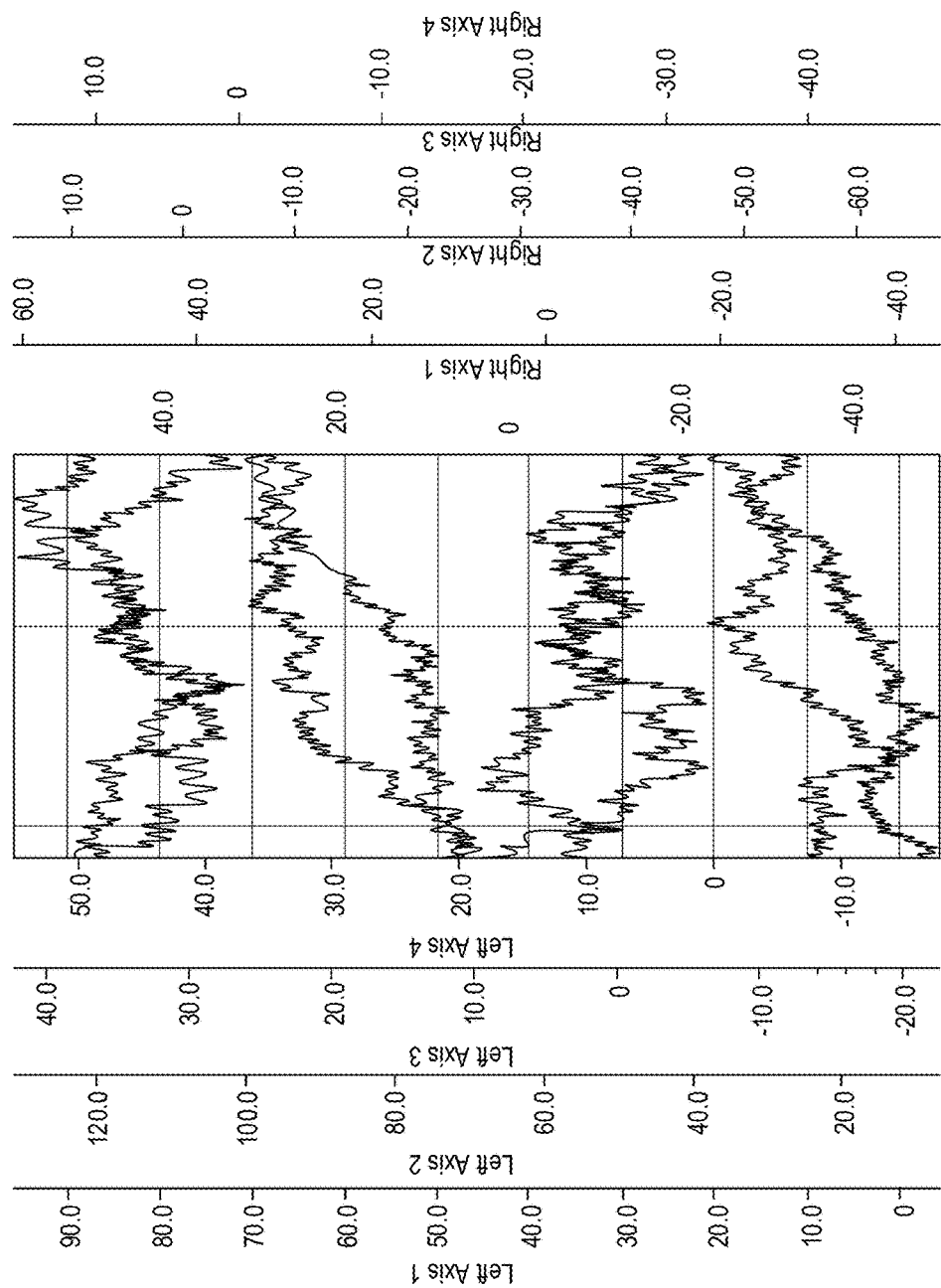
FIG. 4 illustrates a chart that includes multiple scales.

While some existing systems have been configured to resize disparate visualizations into a set boundary, similar to what was described in reference to FIG. 2, those existing systems can still be difficult to read and interpret. For instance, it can be difficult to identify which scale(s) correspond to which visualization(s). If only a single scale for one of the visualizations is present, as reflected by scale 230 in FIG. 2, it can be difficult to understand what the values for the other visualization(s) are. Some existing systems try to address this problem by "stacking" a plurality of different scales adjacently along the Y axis. Stated differently, those existing systems visualize numerous different scales (one for each of the different datasets) along the Y axis. This practice is shown in FIG. 3. Other existing systems attempt to position different Y axis scales on opposing sides of the chart, as is currently shown in FIG. 4. While this technique does enable a user to see the different visualization values, these charts can be quite confusing and difficult to read, particularly when large quantities of datasets are visualized.

The present embodiments can be used to help overcome some of the deficiencies prevalent throughout the existing technology. In particular, the present embodiments can be used to help improve the clarity and intuitive readability of charts that incorporate many different visualizations and scales. In some instances, this can reduce the amount of time required to be spent analyzing chart data and/or the computing processes required to manipulate the chart into a more intuitive chart.

One feature of the presently disclosed embodiments, is a feature that enables a user to selectively hide one or more of the scales, as was suggested in the disclosure regarding FIG. 2. In some embodiments, the scales are selectively hidden until a user selectively triggers an action that results in the previously hidden scale(s) to become visualized. By incorporating this functionality, the present embodiments enable charts to remain decluttered until a user wants to view certain relevant scales for particular datasets of interest. These tools and functionality can also reduce the amount of menu navigation that would otherwise be required to implement the desired modifications to the chart. As detailed above, the user can trigger the display of the hidden scale at any time of his/her choosing.

The triggering of the hidden scale can occur in response to a number of actions. For example, the triggering can occur in response to a user selecting 1) a label on the chart, 2) a menu option, 3) the visualization, 4) a legend element associated with the visualization, and/or 5) any other element that is associated with the visualization and that is associated with the hidden scale. In some instances, the user can also right click on the displayed scale (or select another object) and a new menu will be displayed with options for enabling the selection of the scale(s) to be display.

Other embodiments can provide a menu for selecting scales. This menu may be provided with the chart or in a separate frame. Then, when any combination of scales are selected, the embodiments will cause those selected scales to be displayed.

Figure 5:
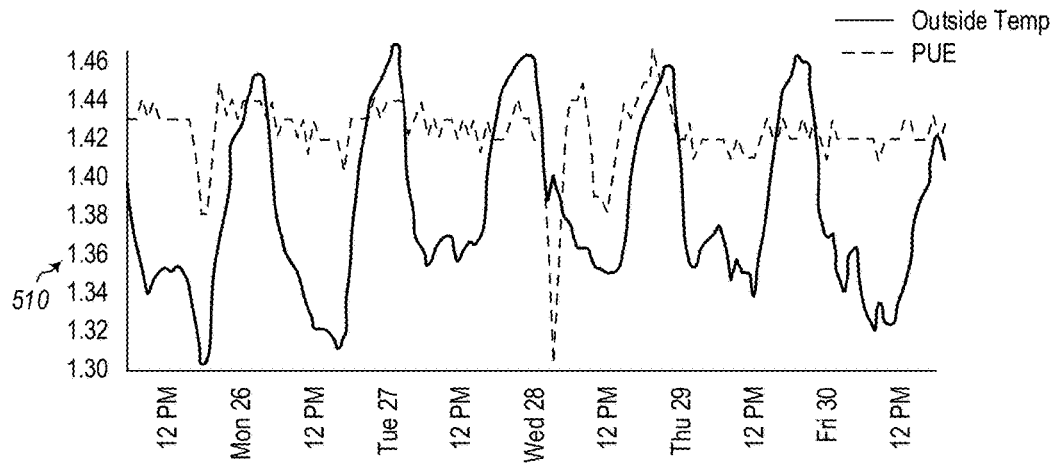
FIG. 5 illustrates a chart that has customizable scales.

While similar to FIG. 2, FIG. 5 includes one key difference. For example, FIG. 5 illustrates the same datasets of FIG. 2 (i.e. dataset 210 and dataset 220, the labels are not shown in FIG. 5), but FIG. 5 now illustrates a new scale 510. This new scale 510 can be visualized after an event is triggered. For example, the triggering event can include a user selecting label on the chart, some other visualization on the chart, or even some other kind of triggering mechanism. This triggering event caused the previous scale on the Y axis (e.g., scale 230 in FIG. 2) to be changed to the values/labels associated with the PUE numeric scale (i.e. the new scale 510).

FIG. 5 also illustrates how the rendering of a hidden scale, in some instances, can coincide with, or rather trigger, the hiding of a previously rendered scale. In this instance, the previous scale (i.e. scale 230 in FIG. 2) has now been hidden and has been replaced with the new scale 510.

The term "hiding" can mean different things within the context of this disclosure. By way of example and not limitation, "hiding" a scale may include 1) refraining from displaying the scale and/or removing the scale from the chart, 2) obscuring the scale with one or more obstructions so that it is only partially shown, 3) moving a position of the scale so that it is less prominent (e.g., to another side of the chart or further from the chart visualizations), and/or 4) changing a font type or size of the scale to de-emphasize the scale. Likewise, the unhiding or rendering of a previously hidden scale can include any combination of 1) showing any previously removed obstructions from the scale, 2) moving a position of the scale so that it is more prominent (e.g., moving the scale to another side of the chart or moving the scale nearer to certain chart visualizations), 3) emphasizing/highlighting the scale, and/or 4) changing a font type or size of the scale.

Figure 6:
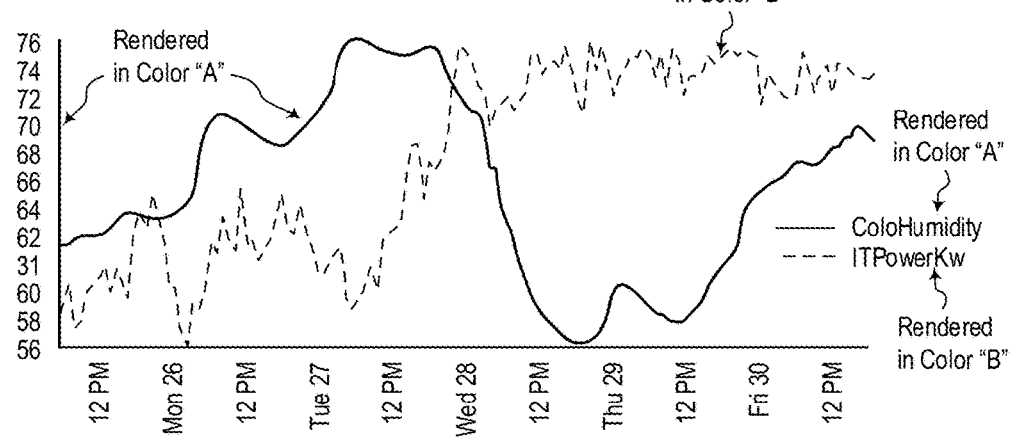
FIG. 6 illustrates a chart that includes customizable chart visualizations.
Figure 7:
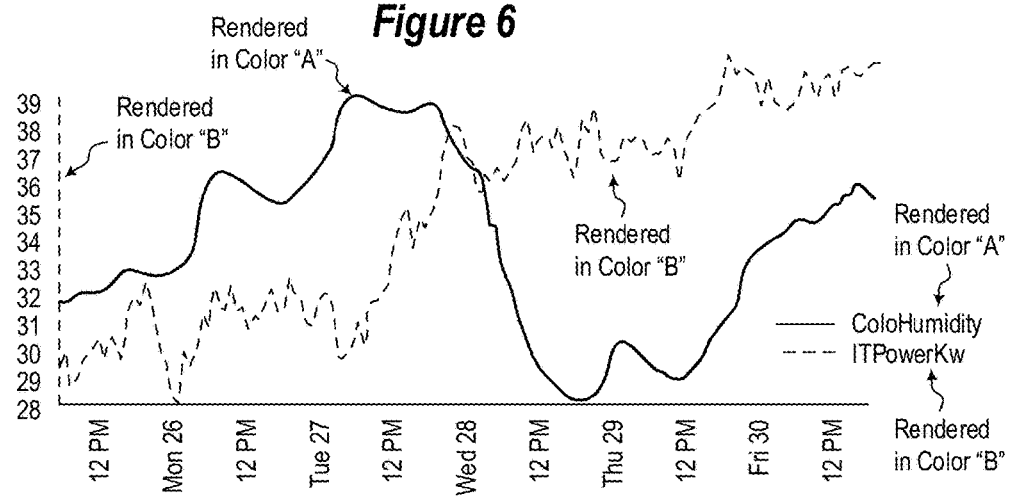
FIG. 7 illustrates another chart that includes customizable chart visualizations.

Other mechanisms can also be used to additionally, or alternatively, reflect the scale that is being displayed. For instance, as shown in FIGS. 6 and 7, the scale that is selectively displayed will sometimes be displayed with a same color as a coloring that is used for the corresponding chart visualization. Specifically, FIG. 6 shows that the label, scale, and chart visualization for "ColoHumidity" are all the same first color (color "A"). This first color is different than a second color (i.e. color "B") that is being used for the chart visualization and label for "ITPowerKw." FIG. 7 shows that the label and chart visualization for "ColoHumidity" are now the same color. In this embodiment the scale, label, and chart visualization for "ITPowerKw" are now the same color, reflecting the scale corresponds to the charted data having the same color.

Highlighting can also be used to highlight correlating scales and/or chart visualizations corresponding to the scales that are being shown.

In some instances, a user can also provide input, through one or more menu options, for selecting the desired positioning and formatting of the scales on the chart. For instance, a user can select 1) whether the scale(s) will be on the left side or right side of the chart, 2) whether the font of the scales will be enlarged or reduced relative to other scales, 3) the coloring of the scales, 4) the relative position of scales on a single side of the chart (when multiple scales are shown), 5) whether the scales will share tick marks or have their own tick marks, and/or 6) any other axis formatting.

In some instances, the user can specify a number of scales to display for the chart. Further, the embodiments will determine how those scales will be formatted and positioned. This determination may be based on similarity or disparity of the scale values and/or the dataset data types. For instance, in some embodiments, if a user chooses to have two scales presented, two scales are identified and used in the visualization that correspond to the greatest number of datasets, (e.g., by identifying scales corresponding to the same types of data and/or same ranges). Then, in some embodiments, any visualizations that share the same scale(s) can be identified by highlighting those visualizations and/or changing coloring/fonts of the visualizations or scales to reflect a correlation between the scales and the relevant visualizations. Icons or labels can also be presented next to legends or labels to reflect which visualizations are relevant to the different scales that are being presented.

Figure 8:
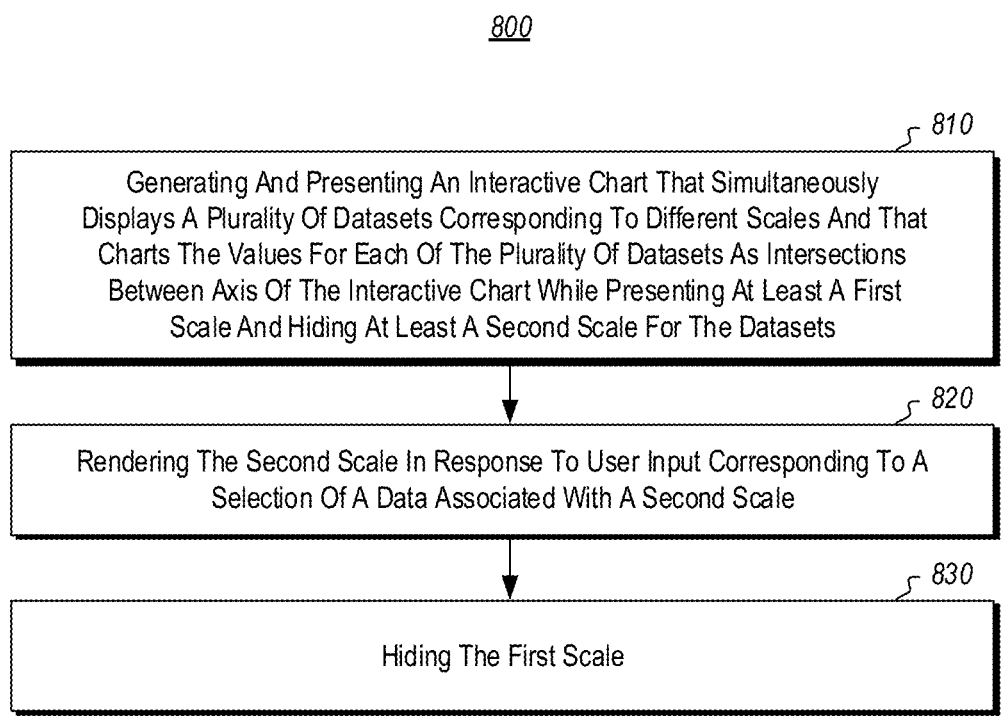
FIG. 8 illustrates an exemplary method for generating interactive chart visualizations.
Figure 9:
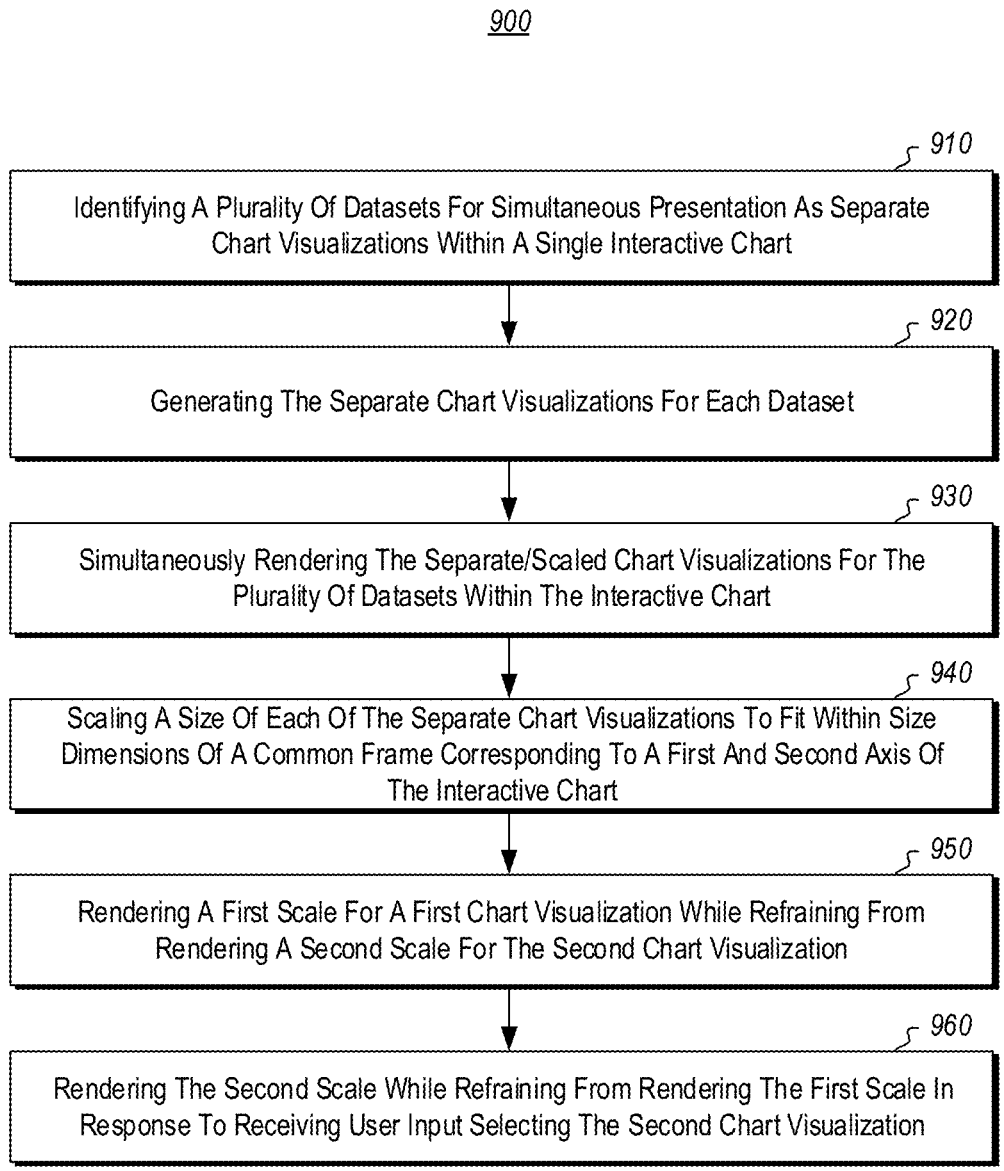
FIG. 9 illustrates an exemplary method for rendering and scaling scales on a chart.
Figure 10:
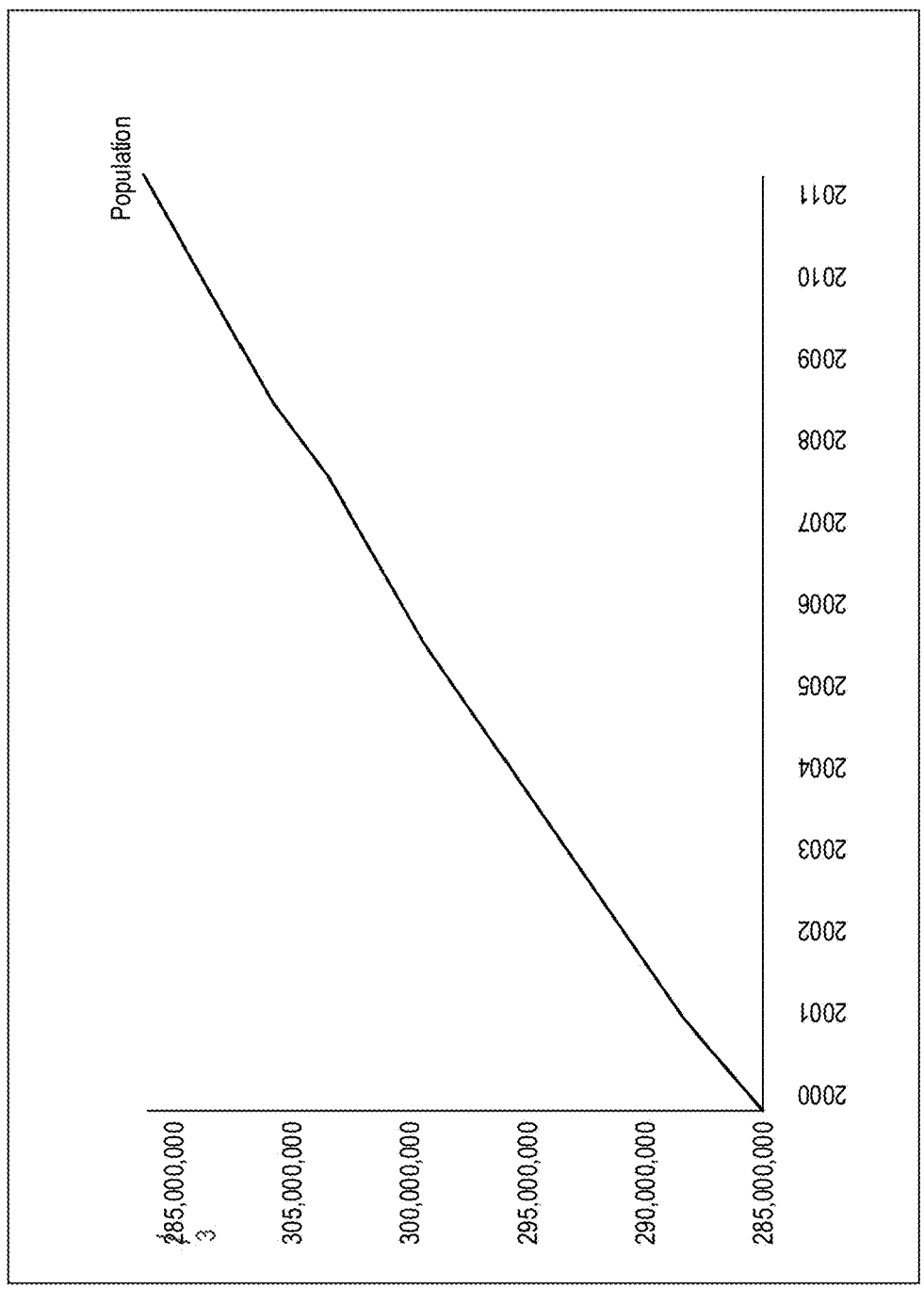
FIG. 10 illustrates a chart visualization for a population over a multi-year span.

Attention will now be directed to FIGS. 8-10. FIGS. 8-10 illustrate different flowcharts and environments associated with methods and systems of the disclosed embodiments.

As reflected by the flowchart 800 of FIG. 8, some embodiments include an act of generating and presenting an interactive chart that simultaneously displays a plurality of datasets corresponding to different scales and that charts the values for each of the plurality of datasets as intersections between axis of the interactive chart while presenting at least a first scale and hiding at least a second scale for the datasets. The second scale, which was initially hidden, is subsequently displayed (in some instances) in response to detecting user input corresponding to a selection of a data associated with a second scale. This user input may also trigger the hiding the first scale while the second scale is displayed.

The first illustrated act of FIG. 8 is the generating and presenting of an interactive chart (act 810). Notably, this chart is based on a plurality of datasets that are identified for charting. The identification can be based on explicit selection of datasets, such as from a list or menu. Alternatively, the identification can be based on inferential information provided to the system, such as a request to chart all datasets associated with a common category, particular topic or within a particular storage location. In some instances, part of the identification process includes verifying that the datasets have a common category of values that are capable of being charted along a single axis (e.g., X, Y or Z axis).

The datasets that are identified for charting will preferably include at least a first dataset and a second dataset. Each of the plurality of datasets have one or more values corresponding to a plurality of different categories. Further, each of the plurality of datasets will also, preferably, share at least one same/common category (e.g., time or another category), as well as at least a first uncommon category. As a result, the first dataset will have values that correspond to the common category as well as at least a first uncommon category, and the second dataset will have values that correspond to the common category and at least a second uncommon category.

When the embodiments generate and present the interactive chart, one or more values for each of the plurality of datasets will be represented as intersections between at least a first axis and a second axis of the chart. The interactive chart will also include a simultaneous display of a first chart visualization for the first dataset and a second chart visualization for the second dataset. The first axis may include scale labels corresponding to the common category. Similarly, the second axis may also include scale labels that correspond to the first uncommon category. However, these scale labels will not correspond to the second uncommon category. As a result, the presentation of the interactive chart refrains from simultaneously presenting a separate scale and scale labels for both of the first and second uncommon categories.

In some instances, the chart visualizations are rendered in 3D space, such as by using an X, Y, and Z coordinate system.

After the interactive chart is presented and in response to user input corresponding to a selection of the second dataset (or another dataset that does not have a scale presented in the chart), the embodiments will change the scale and/or scale labels from the first uncommon category to the scale and/or scale labels for the second uncommon category. This action is performed while still simultaneously displaying the first and second chart visualizations (act 820). In some instances, this action includes changing certain types of scales (e.g., scale for temperature values vs. other data types) or simply changing ranges of an existing scale (e.g., temperature values between 20 degrees and 40 degrees to temperature values between 40 degrees and 80 degrees). Even further, this action may also include 1) changing from a count/numeric value to a percentage scale, 2) changing from a first magnitude of unit to a different magnitude of unit (e.g., centimeters to kilometers), and/or 3) changing from a first format to a second format (e.g., Fahrenheit to Celsius).

When a new scale is presented (e.g., the new scale 510 in FIG. 5), that new scale may be presented (in some instances) with a similar coloring and/or formatting used for the chart visualization that corresponds to the scale. Additionally, new identifiers may also be used. These identifiers can include highlighting which help identify/highlight labels in the legend. Notably, the highlighting is not restricted to only the legend. Instead, the highlighting can also occur in other locations that are associated with the displayed scale.

In some instances, the rendering of the new scale may trigger a hiding of a previously displayed scale (act 830).

FIG. 9 illustrates another flowchart 900 of related methods. In this flowchart 900, the illustrated acts include the identification of a plurality of datasets for simultaneous presentation as separate chart visualizations within a single interactive chart (act 910). The plurality of datasets have values that correspond to a first common category (e.g., time or another common category) and that enable the datasets to be charted along a first axis (e.g., X axis) of the interactive chart. The datasets also have values corresponding to other/different categories that are charted along a second axis (e.g., Y axis) of the interactive chart. Different scales correspond to the different categories for the second axis.

Separate chart visualizations are generated for each of the datasets (act 920). Then, the separate chart visualizations for the plurality of datasets are rendered/visualized within the interactive chart (act 930), with each of the separate chart visualizations being scaled to fit within the common frame. This includes, in some instances, identifying a maximum value and a minimum value for each of the different categories of the separate chart visualizations to be charted along the second axis and scaling a size of each of the separate chart visualizations, based on the maximum and minimum values, to fit within size dimensions of a common frame corresponding to the first and second axis of the chart. (act 940)

Furthermore, upon determining that the separate chart visualizations include a first chart visualization corresponding to a first scale for the second axis and a second chart visualization corresponding to a second scale for the second axis that is different than the first scale, the system renders either the first or second scale while hiding (refraining from rendering) the alternative first or second scale (act 950). Rendering the scale may include generating and rendering appropriate scale labels and new tick mark positions for the second axis.

In some instances, the previously hidden (first or second scale) will be rendered or otherwise exposed/highlighted in response to receiving user input selecting the (first or second) chart visualizations. This may include rendering new scale labels and new tick mark positions for the second axis that were not rendered with the first scale.

In some instances, rendering of the hidden scale will also correspond with a hiding, obscuring or otherwise minimizing the previously rendered first or second scale (act 960).

Although the foregoing acts are discussed in a certain order and illustrated in a flow chart as occurring in a particular order, the acts can also be performed in different ordering, in some instances. By way of example, scaling of the visualizations (act 940) may occur prior to rendering the visualizations (act 930). Further to this point, in some instances, additional acts may be performed or they may be performed iteratively, such as scaling and re-render the visualizations dynamically in response to user input. For instance, user input may be received at the scale or another location that indicates that the range of the scale is to be changed. Then, in response to this input, the different visualizations are rescaled to the new scale range and re-rendered according to the new scaling. FIGS. 10-14 illustrate some of the foregoing features.

FIG. 10 illustrates a chart visualization for a population over a multi-year span. The chart visualization is presented along with a selection menu for enabling a user to select desired datasets to be visualized. Each of the listed items is linked to a dataset of values that can be charted as intersections in a visualization between a common axis (e.g., the X axis, which is associated with time or another common category) and another axis (e.g., the Y axis, which is associated with uncommon categories like population, burglary incidences, etc.).

Figure 11:
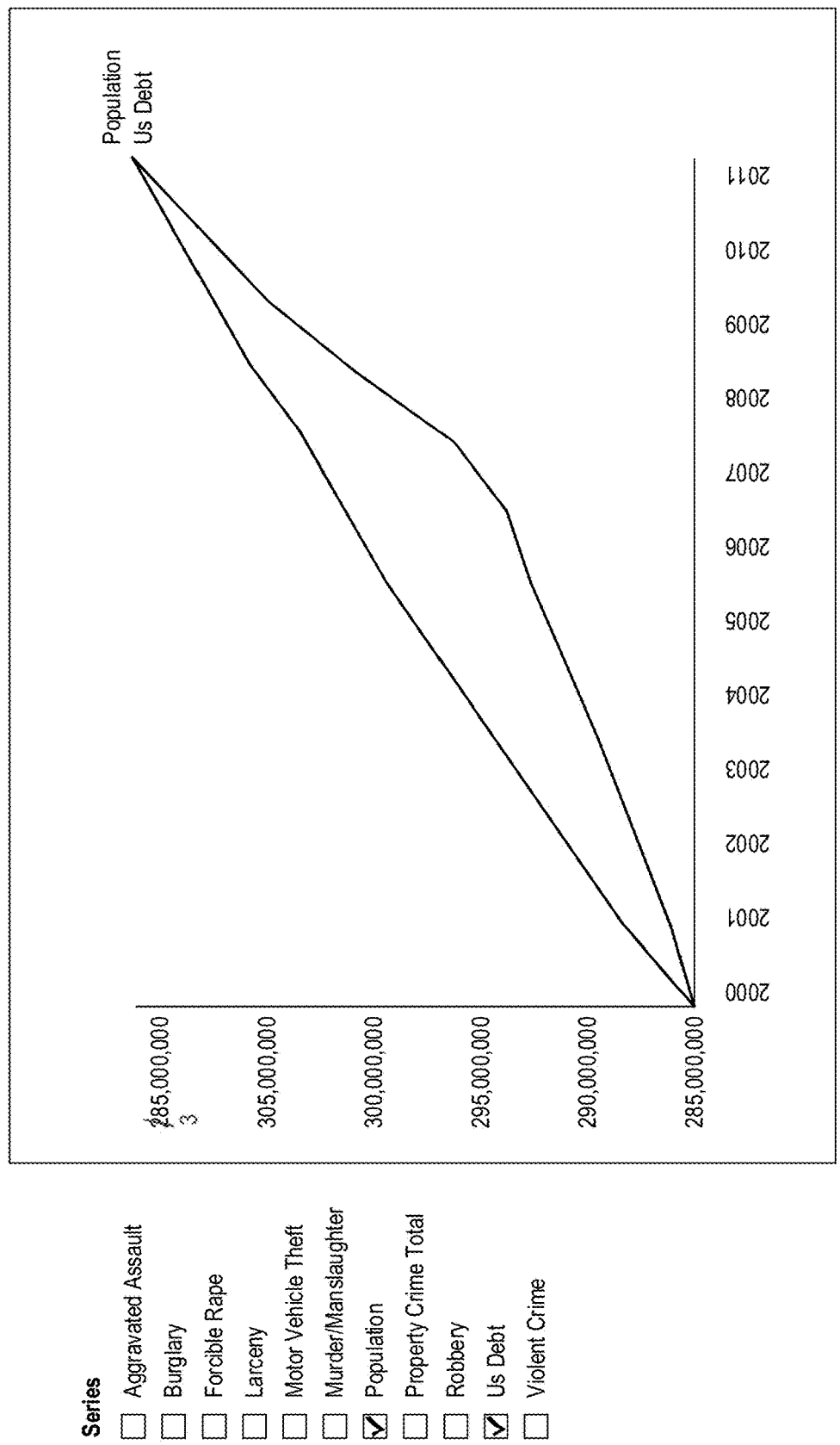
FIG. 11 illustrates a chart in which a certain dataset has been selected and rendered with another dataset.
Figure 12:
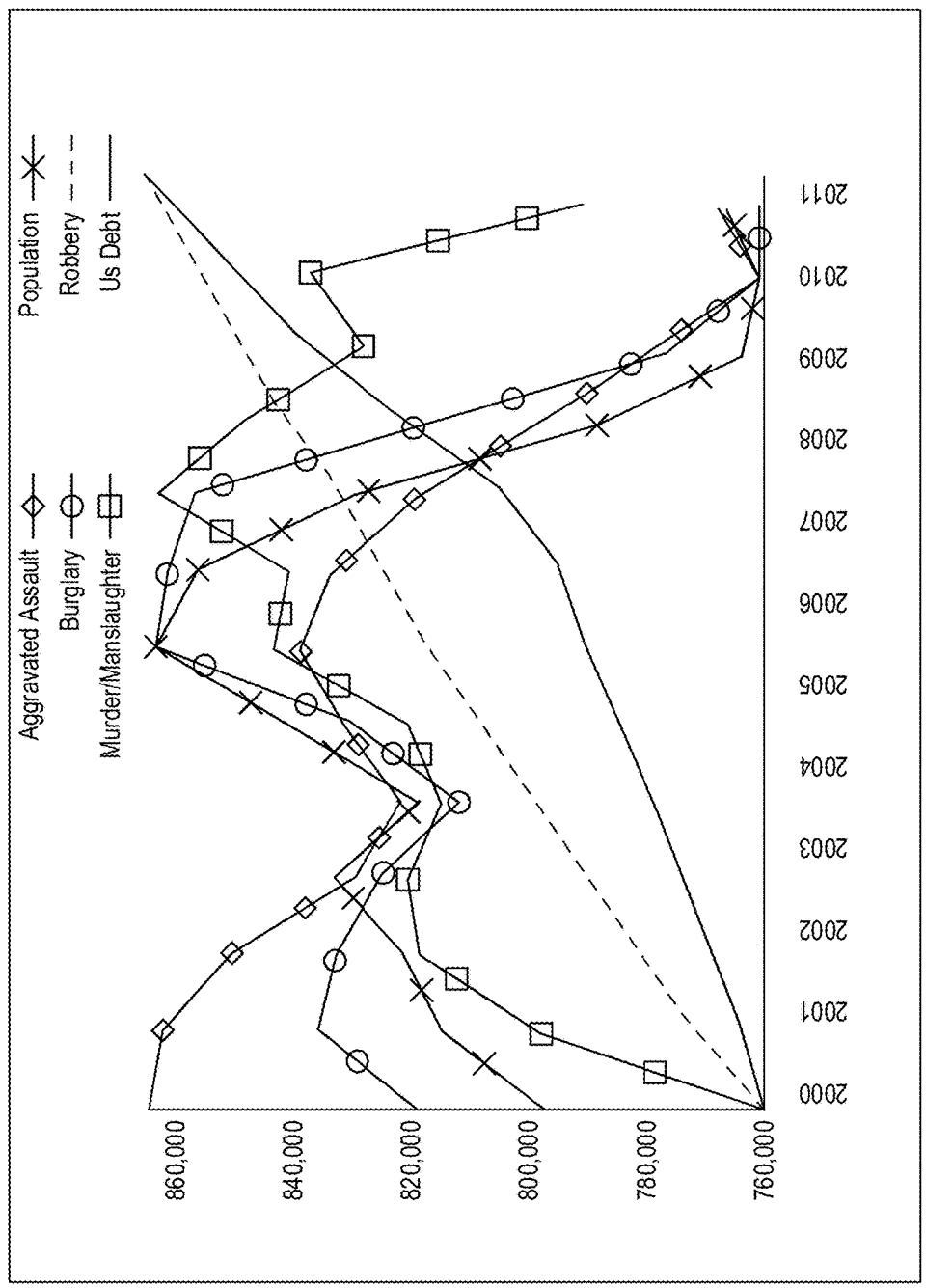
FIG. 12 illustrates another chart that simultaneously visualizes multiple datasets.

When a user selects one or more of the listed datasets, the corresponding dataset is accessed and the data is evaluated for charting. The maximum and minimum values of the dataset are used to scale the dataset visualization to the boundaries of the chart axis (in this case, the Y axis). Then, the chart visualization is integrated into the chart with the other visualizations that are present. FIG. 11, for example, shows that the US Debt dataset has been selected and the corresponding visualization has been prepared, scaled and rendered with the other selected dataset (population).

In FIG. 10, the scale on the Y axis corresponds to the Population. However, when desired, the user can select the term US Debt, in the chart, or click on the US Debt visualization to trigger a change in the scale that is displayed, so that the US Debt scale will be displayed rather than the Population scale. In some instances, the displayed scale will correspond to the most recently selected dataset or visualization. In other instances, the scale will be displayed for the first listed dataset in the legend. For instance, in FIG. 12, the first listed dataset is Aggravated assault. Even though Aggravated assault was selected prior to Robbery, in this instance, Aggravated assault is listed first in the legend (top right corner) and so the corresponding scale for Aggravated assault is displayed on the Y axis.

In some instances, the selection of a visualization or any data associated with the visualization will cause a re-sorting of the legend, so that the last selected dataset will be listed first and so that the user is always aware of which dataset the scale corresponds to. In other embodiments, the scale is colored or highlight with a particular color or highlighting that coincides with a similar/same coloring or highlighting used by the visualization and/or legend label.

When a user de-selects datasets from the menu or otherwise deletes a dataset visualization from the chart which corresponded to a displayed scale, a new scale will be automatically selected and displayed that is appropriate for one or more of the remaining datasets. In some instances, the appropriate scale that is newly selected for display is a scale corresponding to a last selected dataset that is still visualized, or a first listed dataset of the remaining datasets being visualized. In other instances, the appropriate scale is a scale that corresponds most closely in data type, range of values, or other attribute to the recently removed scale. In yet other instances, the new appropriate scale is a scale that corresponds in type or range to a greatest number of remaining datasets.

While many of the foregoing examples have been provided with specific reference to removing a scale completely from the chart, it will be appreciated that the scale be removed, hidden, and/or de-emphasized on the chart, rather than removing it. For instance, the scale can be reduced in size and/or moved to another location on the chart. Furthermore, even though the foregoing examples illustrate only a single scale being presented at a time, it is also possible to present two or more scales at a same time, depending on preference settings that identify a number of scales to be displayed at any given time. For instance, the menu of listed datasets can also include selectable options which, when selected, cause the corresponding scale(s) to be displayed. If multiple scales are selected for display, then they will be displayed simultaneously.

Figure 13:
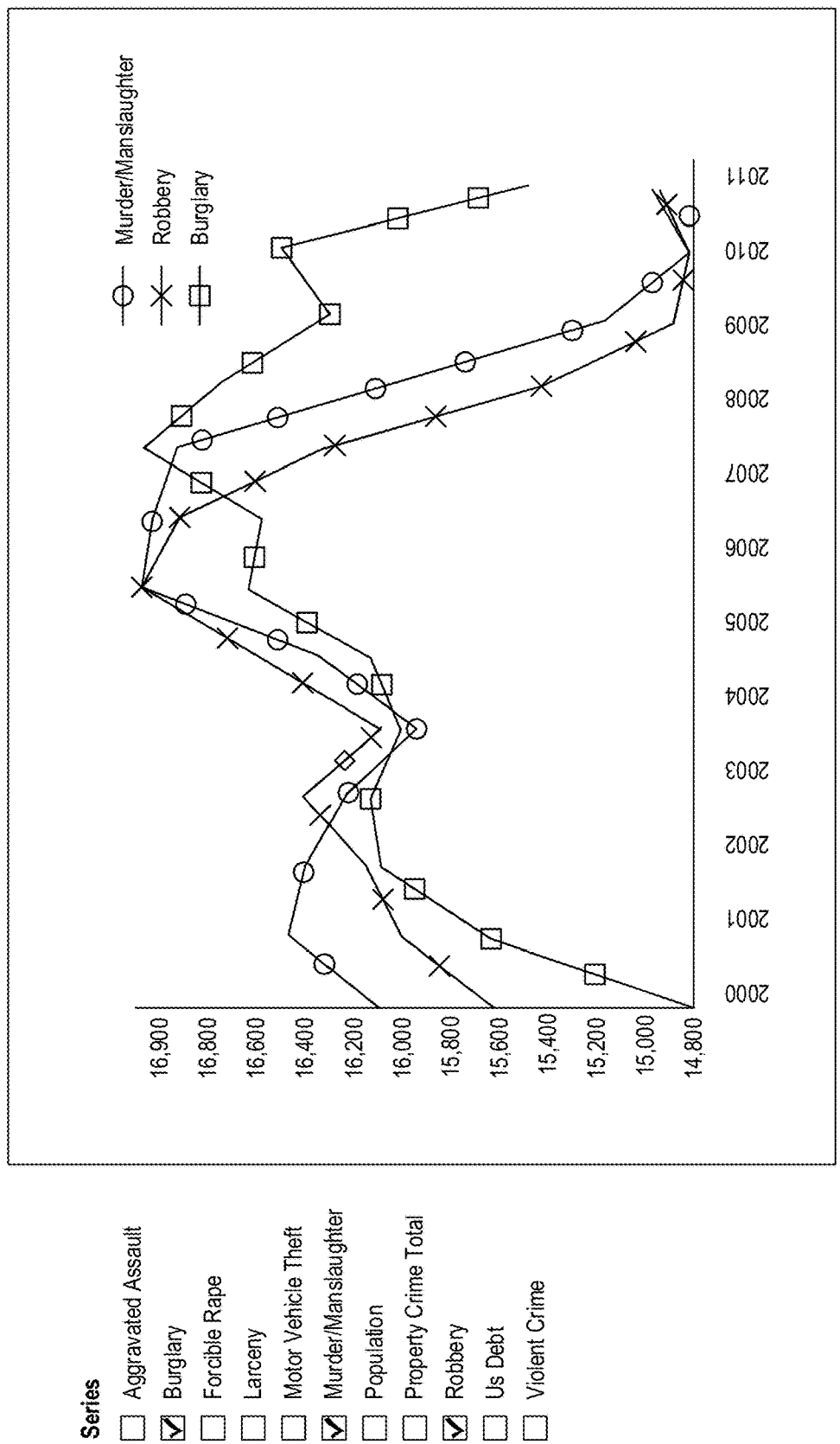
FIG. 13 illustrates another chart that simultaneously visualizes multiple datasets and that shows some functionality corresponding to the scales.
Figure 14:
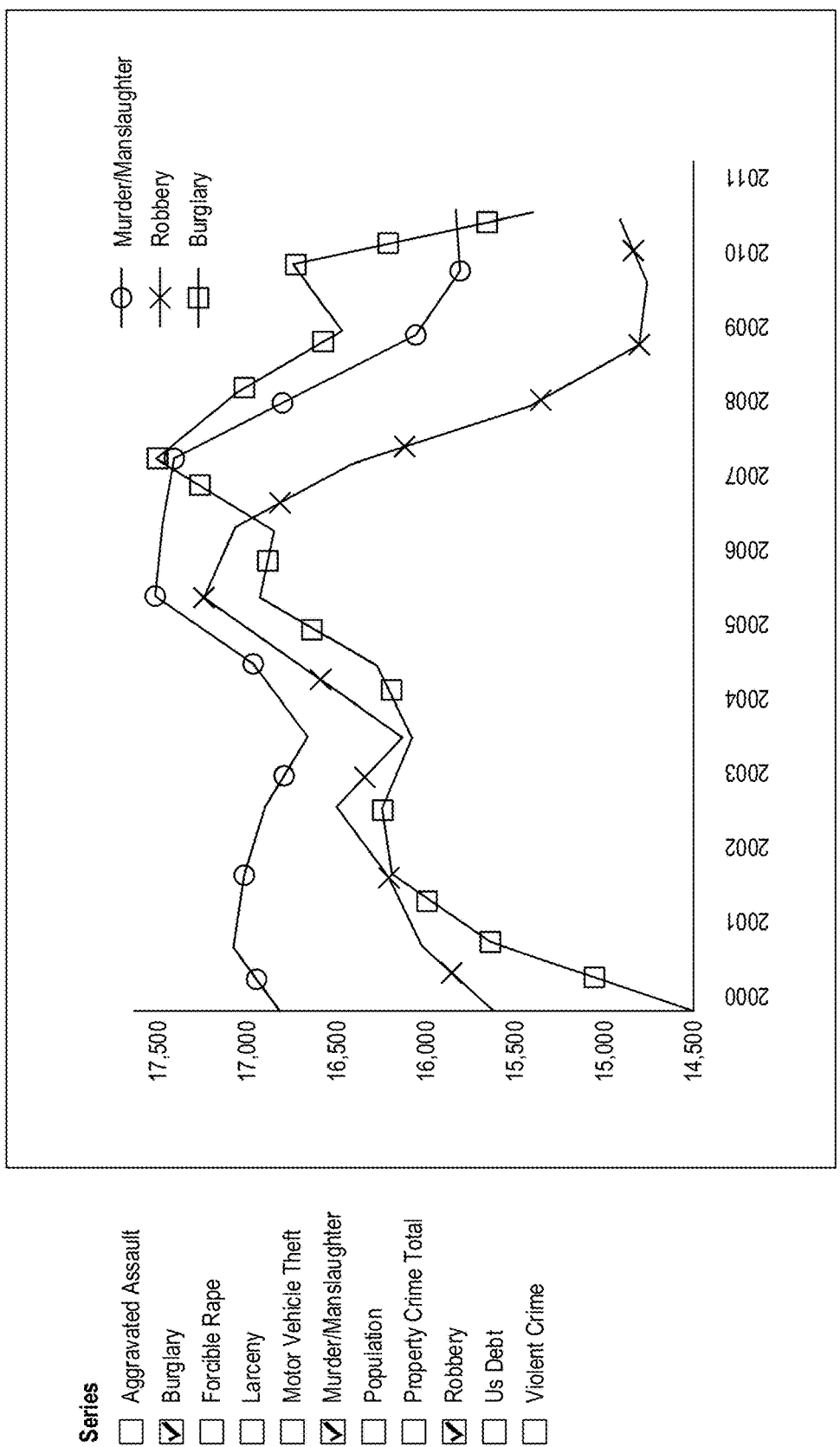
FIG. 14 illustrates an example of a chart in which multiple datasets can be visualized.

Attention will now be directed to FIGS. 13 and 14, which illustrate another aspect of the disclosure, in which the range of the scale is dynamically adjustable in response to user input received at the scale. In FIG. 13, the scale for Robbery incidence is presented on the Y axis. Then, in response to user input selecting and dragging the scale, then range of the scale is altered (as shown in FIG. 14). The scale range can be changed to increase the range or decrease the range, based on dragging the scale in different directions. As the scale range changes, the corresponding visualization will be re-scaled, based on the max and min values, to fit within the predefined boundary of the chart (as shown for the changes to the Robbery visualization). Further, in some instances, if the displayed scale corresponds to multiple datasets, each of the corresponding visualizations will be re-scaled and rendered within the chart with the new scaling.

While many of the foregoing examples have been provided with regard to line charts, it will be appreciated that the disclosed embodiments also apply to other types of charts, including bar charts, histograms, combination charts, 3D charts, and any other type of charts in which a common category is used for a first axis and one or more second axes are used to chart (as an intersection) the disparate values for uncommon categories and/or ranges of the datasets being charted and in which at least one scale (for at least one dataset) corresponding to the second axis is selectively hidden from display.

Figure 15:
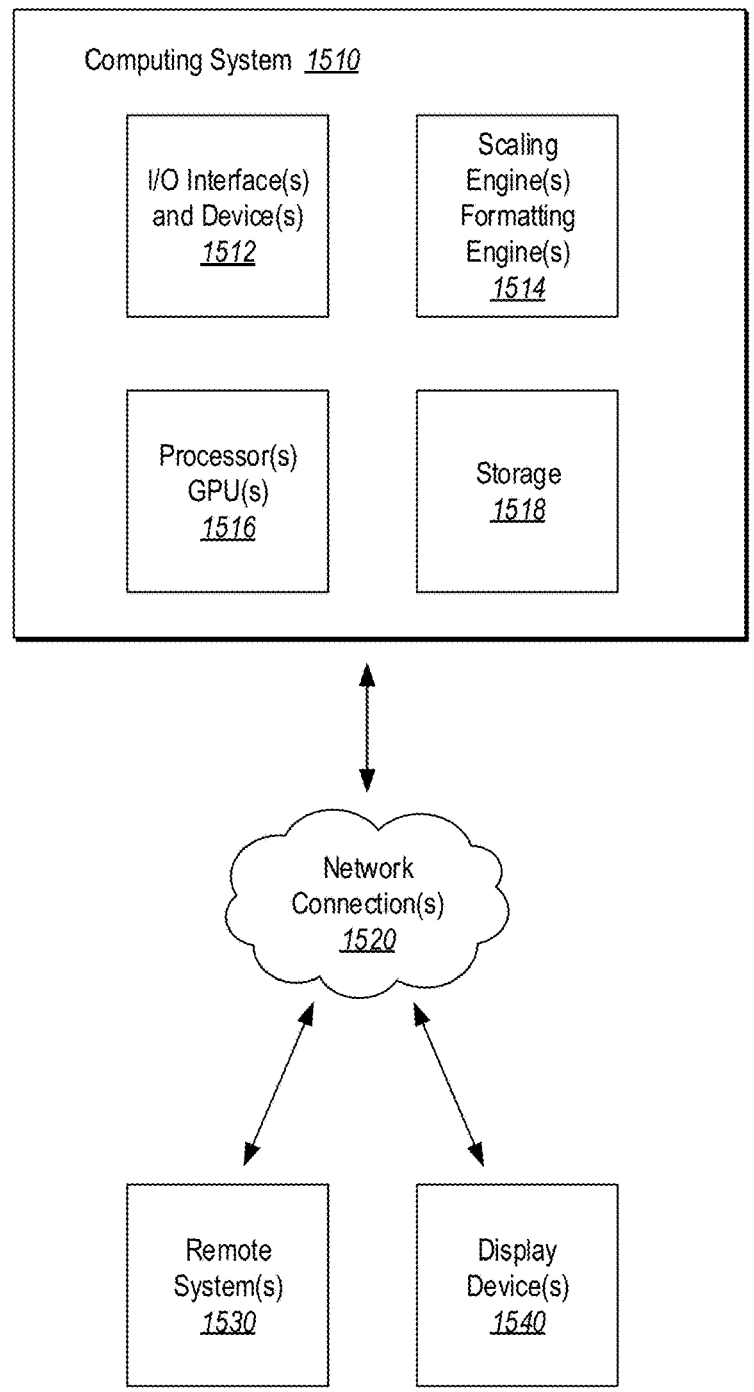
FIG. 15 illustrates exemplary components of a computer system that can be used to render and/or otherwise manipulate charts.

Attention will now be directed to FIG. 15, which illustrates an example of a computing environment 1500 with a computing system 1510 that may be used to implement aspects of the invention. As shown, the computing system 1510 (comprising a distributed or standalone computing system) includes various I/O interfaces (e.g., I/O interfaces and devices 1512) and components for enabling the computing system 1510 to interface with a user, other systems, and/or system components. The system also includes one or more hardware processor(s), such as CPU(s), GPU(s) and other processors (e.g., processors and GPUs 1516). The processors access and execute computer-executable instructions stored within the storage 1518 (which may be volatile and/or non-volatile storage) and which may include system memory, to cause various functions to be performed, such as the acts recited in the embodiments described herein.

The storage 1518 also contains code, for example, to instantiate or operate one or more scaling engines and formatting engines 1514 that are capable of performing the scaling and formatting of the chart visualizations described herein.

The computing system interfaces through one or more network connections 1520 with one or more remote computing systems 1530 and/or display devices 1540 to obtain and/or render the data and visualizations described herein.

When the chart visualizations are presented in 3D, the other display devices 1540 and remote computing systems 1530 can also include head-mounted display devices. The I/O interfaces and devices 1512 can also include gesture detection mechanisms (cameras, magnetic tracking devices, accelerometers, gyroscopes, and other gesture detection mechanisms) to detect and register user inputs that are operable to select chart elements and to make menu and other interface selections.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for generating interactive chart visualizations that incorporate multiple datasets, the method comprising:
   identifying a plurality of datasets for simultaneous presentation as separate chart visualizations within a single interactive chart, the plurality of datasets having values corresponding to a first common category that are charted along a first axis of the interactive chart and values corresponding to different categories that are charted along a second axis of the interactive chart;
   generating the separate chart visualizations by at least:
      identifying a maximum value and a minimum value for the different categories of the separate chart visualizations to be charted along the second axis; and
      scaling a size of each of the separate chart visualizations, based on the maximum and minimum values, to fit within size dimensions of a common frame corresponding to the first and second axis;
   simultaneously rendering the separate chart visualizations for the plurality of datasets within the interactive chart, each of the separate chart visualizations being scaled to fit within the common frame;
   upon determining that the separate chart visualizations include a first chart visualization corresponding to a first scale for the second axis and a second chart visualization corresponding to a second scale for the second axis that is different than the first scale, rendering the first scale while refraining from rendering the second scale; and
   in response to receiving user input selecting the second chart visualization, replacing the first scale with the second scale and without changing the scaling of the separate chart visualizations for the plurality of datasets.

2. The method of claim 1, wherein replacing the first scale with the second scale includes rendering the second scale without rendering the first scale and by at least generating and rendering new scale labels and new tick mark positions for the second axis that were not rendered with the first scale.

3. The method of claim 1, wherein the first scale is rendered with a first color that correlates with a coloring of the first chart visualization and the second scale is rendered with a second color that correlates with the second chart visualization.

4. The method of claim 1, wherein the user input is received at a menu that is presented outside of the common frame of the interactive chart.

5. The method of claim 1, wherein the user input is received within the common frame as input selecting a portion of the second chart visualization.

6. The method of claim 1, wherein the user input is a selection of a label for the second chart visualization.

7. The method of claim 1, wherein the method further includes rendering the separate chart visualizations as 3D visualizations.

8. The method of claim 7, wherein the separate chart visualizations are charted along three different axis.

9. The method of claim 1, wherein
the separate chart visualizations include:
a particular chart visualization corresponding to a particular scale for the first axis that is different than a common scale shared by the first and second chart visualizations;
and wherein the method further includes:
rendering the common scale for the first axis while refraining from rendering the particular scale for the first axis; and
in response to receiving user input selecting the particular chart visualization, rendering the particular scale for the first axis while refraining from rendering the different common scale.

10. The method of claim 1, wherein the method further includes:
simultaneously rendering a plurality of different scales for the second axis, for a subset of the separate chart visualizations, while refraining from rendering at least one scale of the separate chart visualizations that are simultaneously being rendered within the interactive chart.

11. A computer-implemented method for generating interactive chart visualizations incorporating multiple datasets, the method comprising:
identifying a plurality of datasets, including at least a first dataset and a second dataset, each of the plurality of datasets having one or more values corresponding to a plurality of different categories, the plurality of datasets sharing at least one same category, the first dataset having values that correspond to the common category as well as at least a first uncommon category, the second dataset having values that correspond to the common category and at least a second uncommon category;
generating and presenting an interactive chart that visually represents the plurality of datasets and that charts the one or more values for each of the plurality of datasets as intersections between at least a first axis and a second axis, the interactive chart including a simultaneous display of a first chart visualization for the first dataset and a second chart visualization for the second dataset, wherein the first axis includes labels corresponding to the common category and wherein the second axis includes scale labels that correspond to the first uncommon category but not to the second uncommon category, and such that presenting the interactive chart includes refraining from simultaneously presenting a separate scale and scale labels for both of the first and second uncommon categories;
in response to user input corresponding to a selection of the second dataset, changing the scale labels from the first uncommon category to scale labels for the second uncommon category, and while still simultaneously displaying the first and second chart visualizations and without changing the scaling of the first and second chart visualizations.

12. The method of claim 11, wherein changing the scale labels further includes changing tick mark positions for the second axis.

13. The method of claim 11, wherein a coloring of the scale labels for the first uncommon category correlate with a coloring of the first chart visualization and a coloring of the scale labels for the second uncommon category correlate with the second chart visualization, such that changing the scale labels further includes changing a color of the scale labels.

14. The method of claim 11, wherein the user input is received at a menu that is operable to receive a selection of the second dataset.

15. The method of claim 11, wherein the user input is received at the interactive chart by a selection made to a portion of the second chart visualization.

16. The method of claim 11, wherein the user input is received at the interactive chart by a selection made to a label corresponding to the second chart visualization.

17. The method of claim 11, wherein the method further includes scaling a size of the first and second chart visualizations to fit within a predetermined chart window frame, based on maximum and minimum values corresponding to each of the first and second datasets.

18. A computing system comprising:
one or more processors; and
one or more hardware storage devices having stored thereon computer-executable instructions that are executable by the one or more processors to implement a method for generating interactive chart visualizations that incorporate multiple datasets, wherein the method includes:
identifying a plurality of datasets for simultaneous presentation as separate chart visualizations within a single interactive chart, the plurality of datasets having values corresponding to a first common category that are charted along a first axis of the interactive chart and values corresponding to different categories that are charted along a second axis of the interactive chart;
generating the separate chart visualizations by at least:
identifying a maximum value and a minimum value for the different categories of the separate chart visualizations to be charted along the second axis; and
scaling a size of each of the separate chart visualizations, based on the maximum and minimum values, to fit within size dimensions of a common frame corresponding to the first and second axis;
simultaneously rendering the separate chart visualizations for the plurality of datasets within the interactive chart, each of the separate chart visualizations being scaled to fit within the common frame;
upon determining that the separate chart visualizations include a first chart visualization corresponding to a first scale for the second axis and a second chart visualization corresponding to a second scale for the second axis that is different than the first scale, rendering the first scale while refraining from rendering the second scale; and
in response to receiving user input selecting the second chart visualization, replacing the first scale with the second scale and without changing the scaling of the separate chart visualizations for the plurality of datasets.

19. The system of claim 18, wherein the separate chart visualizations are charted along three axis.

20. The system of claim 18, wherein
the separate chart visualizations include a particular chart visualization corresponding to a particular scale for the first axis that is different than a common scale shared by the first and second chart visualizations, and wherein the method further includes:
rendering the common scale for the first axis while refraining from rendering the particular scale for the first axis; and
in response to receiving user input selecting the particular chart visualization, rendering the particular scale for the first axis while refraining from rendering the different common scale.

* * * * *